United States Patent

Larkin

[15] 3,665,120

[45] May 23, 1972

[54] TAPE GUIDE SYSTEM HAVING PICK-UP ELEMENTS WITH CONICAL ENGAGING SURFACES FOR TAPE COURSE CONVERSION

[72] Inventor: Thomas J. Larkin, San Jose, Calif.

[73] Assignee: Cartridge Television, Inc., New York, N.Y.

[22] Filed: June 26, 1970

[21] Appl. No.: 50,056

[52] U.S. Cl. ....................179/100.2 Z, 179/100.2 T, 274/4 C

[51] Int. Cl. ....................................G11b 15/66, G11b 23/04

[58] Field of Search ............179/100.2 Z, 100.2 T, 100.2 MI; 242/55.19 A, 194, 197, 199; 274/4 C, 4 D, 4 E, 11 F, 11 D; 226/49, 91; 35/35 C

[56] References Cited

UNITED STATES PATENTS 3,555,205 1/1971 Barkouki..........................179/100.2 T

FOREIGN PATENTS OR APPLICATIONS 1,537,240 10/1969 Germany..........................179/100.2 T

OTHER PUBLICATIONS

Automatic Tape Threading, Johnson et al., IBM Technical Disclosure Bulletin, Vol. 9, No. 8, Jan., 1967.

*Primary Examiner*—Stanley M. Urynowicz, Jr.
*Assistant Examiner*—Alfred H. Eddleman
*Attorney*—Townsend and Townsend

[57] ABSTRACT

Apparatus for guiding a magnetic tape from a tape cartridge toward and into an operative position adjacent to and extending along a portion of a rotary head assembly. The apparatus includes a pair of tape pick-up elements or guides adapted to support the opposed ends of the stretch of tape extending along the rotary head assembly. Each guide has a surface and a length sufficient to permit the tape to be pulled straight out of the cartridge and then toward and into operative position at which the tape forms a helix angle with the arcuate path of travel of one or more heads of the rotary head assembly. The guides can be adjustably positioned on the means which mount the same for movement into and out of their operative positions.

5 Claims, 7 Drawing Figures

THOMAS J. LARKIN
INVENTOR.
BY
Townsend and Townsend

THOMAS J. LARKIN
INVENTOR.
BY
Townsend and Townsend

THOMAS J. LARKIN
INVENTOR.
BY
Townsend and Townsend

THOMAS J. LARKIN
INVENTOR

BY

Townsend and Townsend

TAPE GUIDE SYSTEM HAVING PICK-UP ELEMENTS WITH CONICAL ENGAGING SURFACES FOR TAPE COURSE CONVERSION

This invention relates to improvements in tape transports and, more particularly, to a tape guide system for a tape transport having a rotary transducer mount or rotary head assembly and adapted for use with a tape cartridge.

In using a tape cartridge with a tape transport having a rotary head assembly, it is necessary to move the tape out of the cartridge and to present it to the head assembly in such a way that the tape can move relative to and along the assembly as the heads thereof scan the tape. If the heads are to scan the tape along oblique tracks thereon, the tape must be presented to the path of the heads at a helix angle. This feature permits the head assembly to achieve the tape-conserving aspects of the skip-field principle wherein selected fields of a series of video image frames are recorded on the tape and each field is later played back several times to provide a video picture of acceptable quality.

One way of presenting the tape to a rotary head assembly is to pull the tape out of the cartridge by a pair of spaced tape guides which are received within recesses in the cartridge behind the tape so that the back side of the tape can be engaged by the guides and pulled outwardly of the cartridge toward the head assembly. The configurations of the guides must be such that when the guides are in their operative positions, the tape span or stretch whose ends are supported by the tape pick-up elements or guides will be presented to the path of travel of the heads at the desired helix angle with the tape stretch wrapped along a predetermined arc of the head assembly.

The present invention provides a tape guide system for a tape transport having a rotary head assembly wherein the system has a pair of tape guides which efficiently perform the function of presenting a tape stretch to a rotary head assembly at a desired helix angle and operate to maintain the angular relationship between the tape and the head assembly even though the tape moves relative to and along a portion of the head assembly. To this end, the guides have configurations which assure the helix angle and guide the tape properly as it is pulled out of the cartridge and moved toward the rotary head assembly.

The guide system of this invention is especially suitable for use with a reel-over-reel cartridge of the type having recesses for receiving the tape guides. The construction of the tape guides of this invention is such that they compensate for the fact that tape is pulled out of the cartridge at one level and moved into the cartridge at another level. Moreover, the tape guides have tape-engaging surfaces which allow the tape to be drawn straight out of the cartridge before being moved about the rotary head assembly. This feature permits the cartridge to be of minimum width to thereby minimize its overall dimensions without reducing the amount of tape within the cartridge.

The primary object of this invention is to provide a system for guiding a tape out of a tape cartridge and along a portion of a rotary head assembly of a tape transport wherein the construction of the system is such that the angular relationship between the tape and the paths of the heads of the assembly is maintained at all times when the tape guides are in their operative positions so that the heads can properly scan the tape along oblique tracks as the tape moves past the head assembly.

Another object of this invention is to provide a guide system of the type described wherein the system includes a pair of spaced tape guides whose configurations are such that the tape can be pulled straight out of the cartridge before being moved about a portion of the head assembly to thereby permit the size of the cartridge to be minimized and to facilitate the removal of the tape from the cartridge.

A further object of this invention is to provide a guide system of the aforesaid character wherein the tape guides of the system properly guide the tape as it is moved out of a reel-over-reel cartridge and toward and into an operative location along the rotary head assembly notwithstanding the fact that the tape leaves the cartridge at one level and enters the cartridge at another level.

Other objects of this invention will become apparent as the following specification progresses, reference being had to the accompanying drawings for an illustration of the invention.

Figure 1:
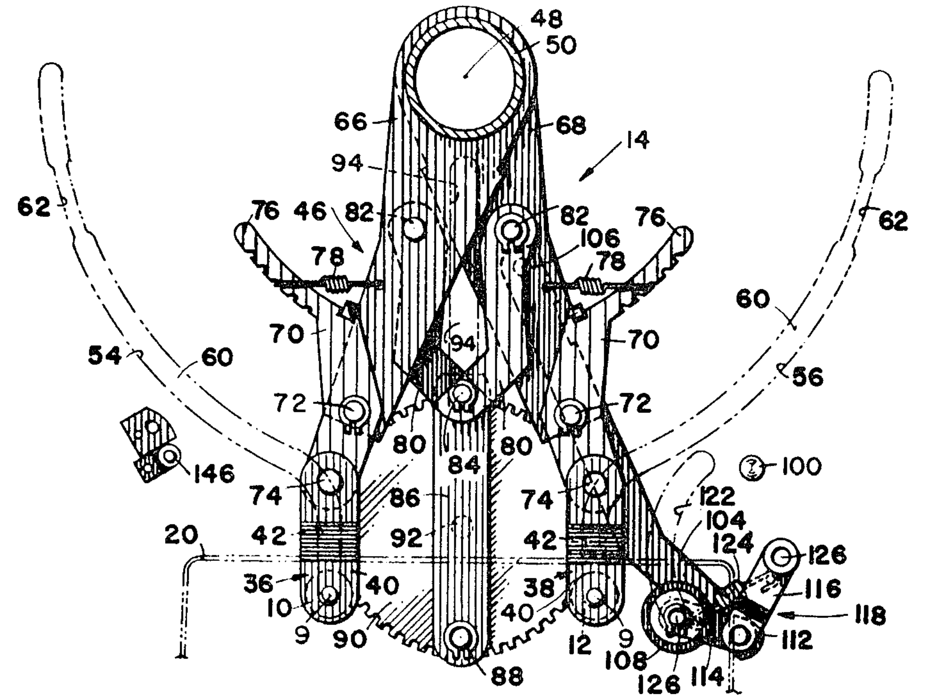
FIG. 1 is an elevational view of the drive apparatus of this invention showing the guides thereon in dashed lines and in retracted positions.

A pair of tape pick-up elements or guides 10 and 12 are coupled by drive apparatus 14 to a base plate 16 for movement from retracted positions (FIGS. 1 and 6) to operative positions adjacent to the outer periphery of a rotary head assembly 18 forming a part of a tape transport. The tape guides are adapted to pull a span or stretch 20 of a magnetic tape in a cartridge 22 in a direction out of the cartridge and about a portion of the arcuate path of travel of one or more magnetic heads 24 mounted on a disk 26 adjacent to the outer periphery thereof, head or heads 24 and disk 26 forming parts of rotary transducer mount or rotary head assembly 18. In their operative positions, the tape guides support the ends of the tape stretch when the latter is contoured by fixed, semi-cylindrical contour members 28 and 30 (FIG. 3), such members being on opposite sides of disk 26. Thus, the tape can move relative to and along the fixed guide members as disk 26 rotates relative thereto. Head 24 can then scan the tape.

Figure 6:
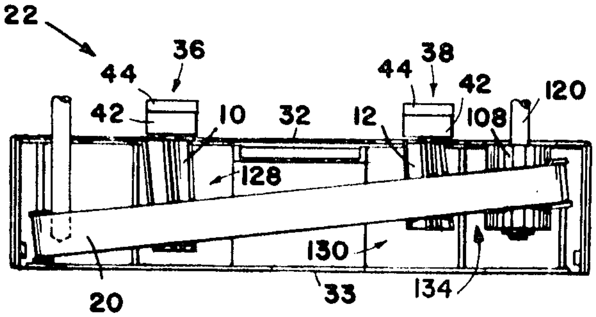

Preferably, assembly 18 has a number of heads 24 so that it can utilize the skip-field principle for the recording and play back of video signals on the tape. To utilize this principle, tape stretch 20 must be played to the path of the heads at a helix angle and the heads must be axially staggered relative to each other. Guides 10 and 12 are shaped to present tape stretch 20 at the desired angle since the tape guides are of different lengths as shown in FIG. 6 and pull stretch 20 initially straight out of the cartridge as hereinafter described. As shown in FIG. 6, the tape is carried by the cartridge at an angle to the planes of the front and rear walls 32 and 34. That is, the span of tape, as presented by the cartridge, is inclined.

Figure 3:
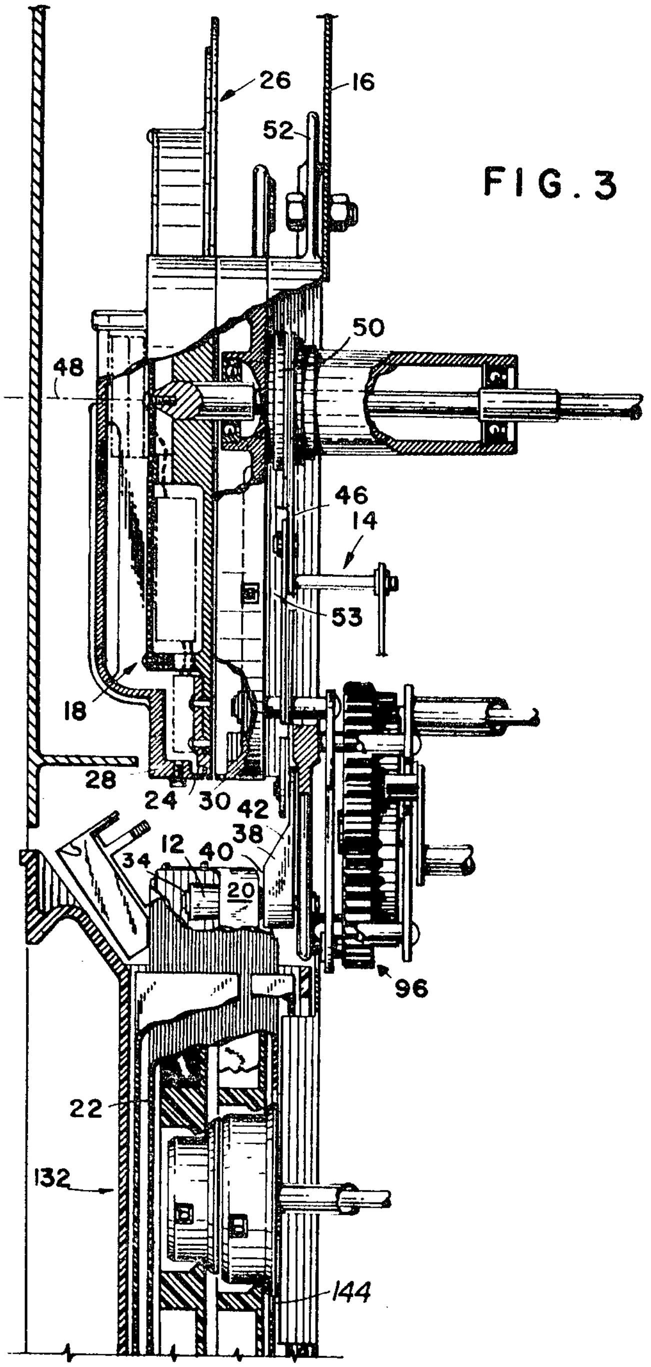
FIG. 3 is a vertical section through the head assembly, showing the drive apparatus of this invention.

Tape guides 10 and 12 are rigidly secured by attachment devices 9 to respective drag links 36 and 38 with each guide extending laterally from a surface 40 of the corresponding drag link. Each drag link has an inclined surface 42 which extends away from surface 40 (FIG. 3) and a mounting tab 44 which is pivotally coupled to arm structure 46 for rotation about the central axis 48 of disk 26. Base plate 16 is, for purposes of illustration, vertically disposed so that axis 48 is generally horizontal. Disk 26 is rotatably mounted to an arbor 50 which is secured to a support plate 52 secured by screws to the base plate (FIG. 3). Contour members 28 and 30 are rigidly secured to support plate 52 in suitable manner, with guide member 30 being spaced laterally from the plane of the base plate to present a space 53 for receiving arm structure 46. Support plate 52 has a pair of grooves defining respective tracks 54 and 56 for drag links 36 and 38, respectively. Each track 54 has a straight portion 58 and an arcuate portion 60 connected with portion 58. Each arcuate portion has a restricted section 62 which is remote from the corresponding straight portion 58.

Figure 4:
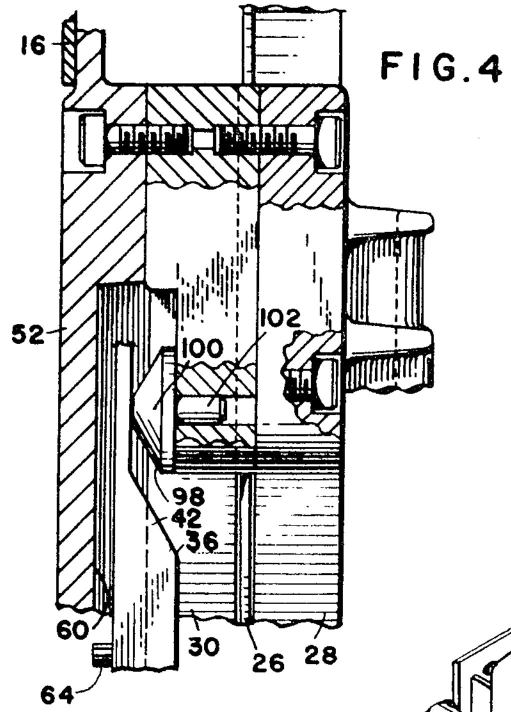
FIG. 4 is an enlarged, fragmentary view of a portion of the drive apparatus, showing the way in which it moves one of the tape guides into its operative position.

Each drive link has a follower 64 (FIG. 4) which is loosely received within portions 58 and 60 of the corresponding track but is tightly received within the corresponding restricted section 62. A clearance of approximately 1 mil. is provided between follower 64 and the adjacent sides defining restricted section 62 to allow some movement of the follower into and along the section with substantially no lateral movement of the follower.

The relatively loose fit of the follower in the major portion of its track eliminates the need for close tolerances as the corresponding tape guide is being moved from its retracted position to its operative position. It is only when the follower enters the restricted section 62 near the operative position of the guide that tolerance minimums are required. When the follower is in the restricted section, the tape guide is effectively held against radial movement relative to the head path, the follower being substantially aligned with the guide.

Arm structure 46 includes a pair of first radius arms 66 and 68 which are rotatably mounted on arbor 50 and extend downwardly therefrom when the tape guides are in their retracted positions. Arms 66 and 68 are relatively thin and have opposed flat faces so that they can overlap each other near arbor 50 and can be received within space 53 without interfering with other structures.

Each radius arm has a second arm 70 which is pivotally mounted by a pin 72 on the outer end of the radius arm. Pin 72 is intermediate the ends of arm 70. The arm 70 is pivotally connected to drag link 38 at one end by a pin 74 and has a notched, angled extension 76 at its opposite end. The other arm 70 is similarly arranged and is pivotally connected to drag link 36. Coil springs 78 individually bias each extension 76 toward the adjacent radius arm. Arms 70 are also flat and relatively thin so that they can easily overlap with adjacent radius arms.

Figure 2:
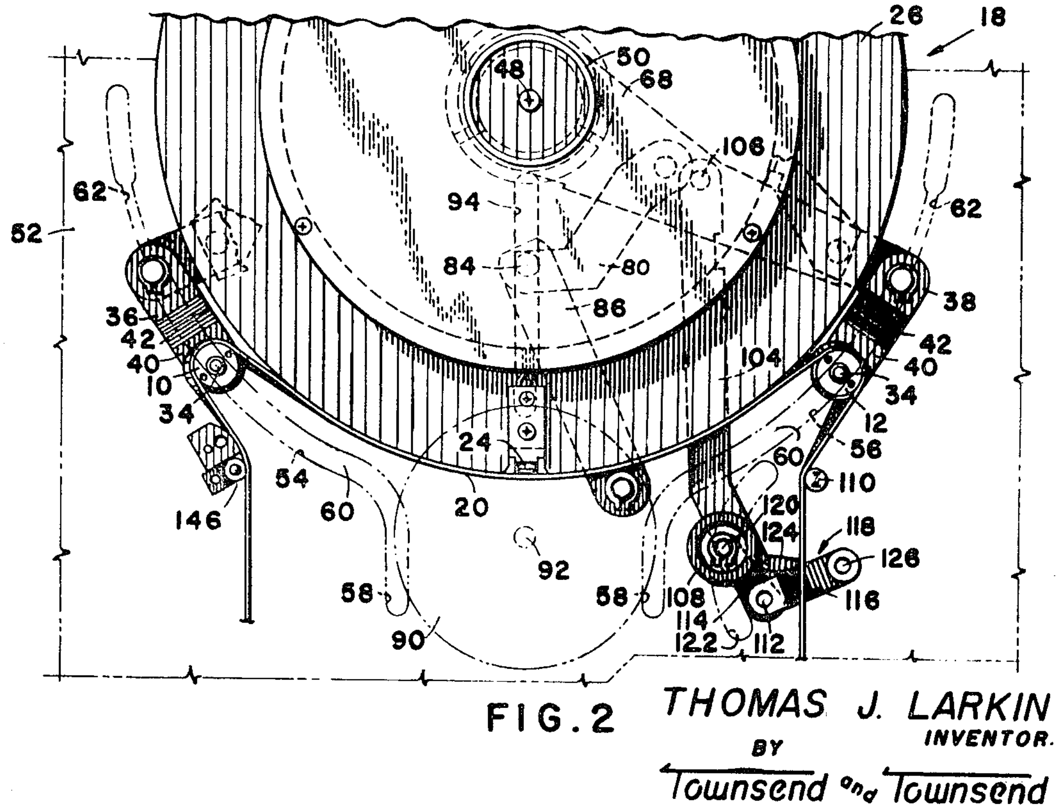
FIG. 2 is a view similar to FIG. 1 but showing the apparatus behind a rotary head assembly.

A pair of toggle links 80 are pivotally secured by pins 82 to the radius arms in spaced relationship to arbor 50. A pin 84 pivotally interconnects the outer ends of toggle links 80 with a master link 86 which is pivotally connected by a pin 88 to the outer peripheral margin of a crank wheel 90 mounted on support plate 52 for rotation about an axis 92 substantially parallel to and in vertical alignment with axis 48 (FIGS. 1 and 2). A slot 94 (FIG. 1) in support plate 52 receives pin 84 and guides the latter as crank wheel 90 rotates links 86 in the manner shown in FIG. 2. The crank wheel is coupled to a drive motor (not shown) by structure 96 (FIG. 3).

As each drag link is moved upwardly by its radius arm, surface 42 of the drag link moves into engagement with the inclined surface 98 (FIG. 4) of a camming element 100 having a shaft 102 received within contour member 30. The inner engagement of surfaces 42 and 98 causes the drag link to be forced against the adjacent surface of base plate 52 to thereby determine the position of the corresponding guide on the drag link axially of the head path.

Another link 104 is pivotally connected by a pin 106 to radius arm 68 and is adapted to move a pinch roller 108 toward and adjacent to a rotatable capstan 110 whereby the tape between the pinch roller and the capstan can be driven by the latter in a predetermined direction. The lower end of link 104 is coupled to a pin 112 which pivotally interconnects a pair of crank arms 114 and 116 of a crank 118. Pinch roller 108 is rotatably mounted on a shaft 120 coupled to the outer end of crank arm 114, shaft 120 extending through a guide slot 122 in support plate 52. A coil spring 124 biases crank arms 114 and 116 toward each other. A pin 126 pivotally mounts the outer end of crank arm 116 on base plate 52.

Figure 5:
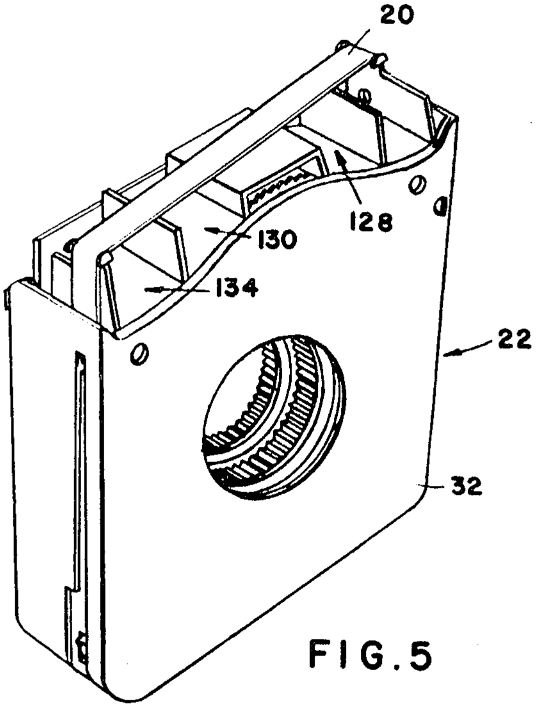
FIG. 5 is a perspective view of a cartridge usable with the tape guides of the invention; and, FIG. 6 is a top plan view of the tape cartridge with the tape guides received therewithin.

Cartridge 22 has a pair of recesses 128 and 130 (FIG. 5) for receiving tape pick-up elements or guides 10 and 12 when the cartridge is moved by a carriage mechanism 132 into an operative position beneath rotary head assembly 18 (FIG. 3). Also, the cartridge has a third recess 134 which receives the pinch roller 108 as the cartridge is moved into its operative position. The tape guides and the pinch roller are shown in the cartridge recesses in FIG. 6.

The size, configurations and operative positions of tape guides 10 and 12 are selected upon the basis of a number of parameters which establish the format of the tape resulting from the use of the guides. These parameters are as follows:

| | | |
|---|---|---|
| width of tape | .500 | in. |
| speed of disk 26 | 1198.801 | rpm |
| diameter of disk 26 | 8.600 | in. |
| tape linear speed | 3.8004 | in./sec. |
| video track height | .417 | in. |
| video head gap length | .0060 | in. |
| helix angle | 2.5572 | ° |
| head-to-tape speed | 543.6107 | in./sec. |
| video track angle | 2.5394 | ° |
| video track length | 9.2765 | in. |
| video guard band | .0243 | in. |
| tape wrap angle | 123.5676 | ° |

For a skip-field system utilizing tape guides 10 and 12, three heads are mounted on disk 26 at circumferentially spaced locations thereon, the heads being axially staggered relative to each other. The pertinent parameters relating the heads are as follows:

| | | |
|---|---|---|
| angle between heads 1 and 2 | 120.614 | ° |
| angle between heads 2 and 3 | 121.074 | ° |
| angle between heads 3 and 1 | 118.312 | ° |
| head 1 elevation | .000 | |
| head 2 elevation | −.0039 | in. |
| head 3 elevation | −.0079 | in. |

Each of the tape guides is configured to allow the tape to be pulled straight out of the cartridge and to remain straight between the cartridge and roller 146 (FIG. 2) and between the cartridge and the capstan. Moreover, the tape extending between each tape guide and the cartridge remains in a single plane, such plane being substantially parallel with the plane of the tape corresponding to the other guide. Thus, the changes in the level of the tape necessitated because a reel-over-reel cartridge is used occur at the tape pick-up elements themselves. This feature eliminates other guide structure between the cartridge and the tape pick-up elements of this invention. Moreover, the guides or pick-up elements orient the tape so that it is at the helix angle to the head path.

Each guide has a conical outer surface which engages the tape as it passes about the guide. The tape on each guide does not extend completely around the guide when the latter is in its operative position. Thus, a portion of the outer surface of the guide is not needed and such portion can be cut off or flattened to permit the guide to clear adjacent structure, such as the inner surface of a tape cartridge. Each guide has a particular axially extending location which is a line parallel with the axis of disk 26 and from which the tape extends tangentially so as to properly extend to the rotary head assembly at the helix angle and to be tangent thereto. At this orientation of each guide, the tape is held against drift along the guides so that the helix angle is maintained.

Figure 7A:
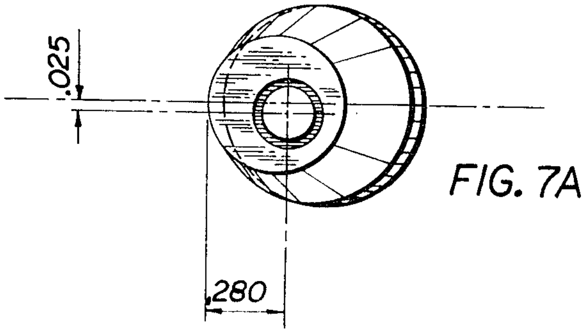
FIG. 7 and 7A are dimensional views of one of the tape guides of this invention.
Figure 7:
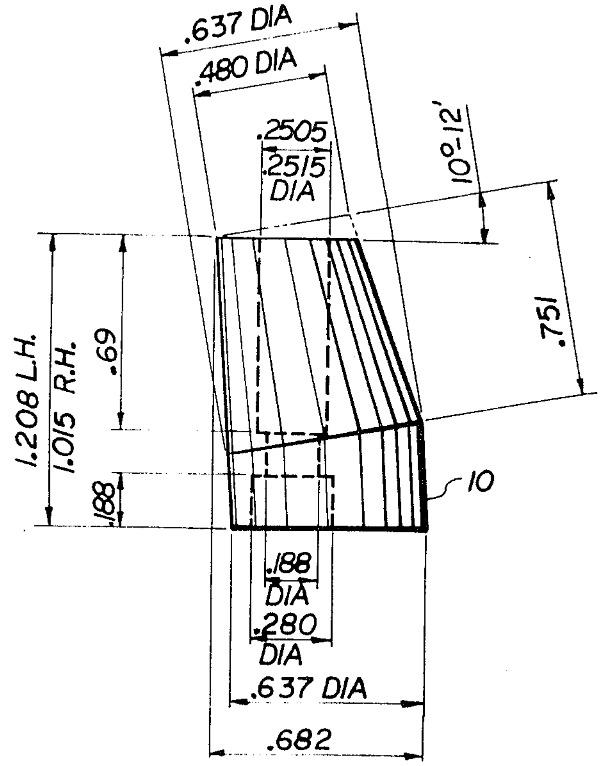

A preferred configuration for each of the tape guides is shown in FIG. 7, wherein guide 12 is illustrated. It is identical with guide 10 in that they have the same conical outer surface only in reverse fashion. Each has a spacer to control the distance of the guide from support plate 52 to thereby compensate for the fact that the tape is angled (FIG. 6) in the cartridge, guide 10 having a longer spacer than guide 12. As shown in FIG. 7, each of the guides has a bore therethrough, the being adapted to receive a shaft secured to and extending laterally from the corresponding drag link. A screw can be threaded into the outer end of the shaft and can engage the guide to releasably secure the guide to the drag link. By adding a drop of epoxy or other suitable material over the screw, the attachment is made permanent.

With the above tape and guide geometry, the center lines of the tape portions extending outwardly from the cartridge when the tape guides are in their operative positions is approximately 0.630 inch. Also the distance from a line passing through the central axes of the rotary head assembly and the cartridge is approximately 3.313 inches midway between the tape portions extending outwardly from the cartridge.

Subject matter disclosed, but not claimed herein, is claimed in various ones of the following copending U.S. Patent applications, assigned to the same assignee as the present application and filed on the same day, June 26, 1970: as to the apparatus generally, patent application Ser. No. 50,059, Richard A. Hathaway, entitled "Tape Transport Apparatus;" as to the guide system generally, patent application Ser. No. 50,245, William W. Swain and Richard A. Hathaway, entitled "Drive for Tape Guides of Tape Transport;" and as to the cartridge, Patent application Ser. No. 50,125, William W. Swain, "Tape Cartridge."

I claim:

1. A tape guide system for a tape transport having a rotary head assembly and adapted for use with a reel-over-reel tape cartridge comprising: means adapted to position a tape cartridge in an operative location relative to said rotary head assembly so that an inclined span of tape is presented; a pair of tape pick-up elements; and means mounting the tape pick-up elements for movement from behind said span of tape when the tape cartridge is in said operative location to positions adjacent to the rotary head assembly, whereby a stretch of tape is pulled out of the cartridge and wrapped about a portion of said rotary head assembly, one of said tape pick-up elements having a conical tape-engaging surface with apex up and the other of said pick-up elements having a conical tape-engaging surface with apex down, said tape pick-up elements being configured to withdraw the tape from the cartridge and orient the tape relative to said rotary head assembly for helical scanning.

2. A tape guide system as set forth in claim 1, wherein the surface with apex up projects closer to the base plate than the surface with apex down.

3. A tape guide system for a tape transport having a rotary head assembly and adapted for use with a reel-over-reel tape cartridge comprising: a base plate; a pair of tape pick-up elements, each pick-up element having a conical outer surface provided with an axially extending portion, one pick-up element being disposed with its apex up and the other element with its apex down, said portion being generally parallel with the central axis of said rotary head assembly when the latter is on the base plate; and means coupled with the tape pick-up elements for moving the same from retracted positions corresponding to locations within a tape cartridge aligned with the rotary head assembly to operative positions corresponding to locations adjacent to the rotary assembly, whereby the tape pick-up elements can pull a stretch of tape out of the cartridge and about a portion of said rotary head assembly, said portion of each tape guide being disposed to be tangentially engaged by the tape as it extends from the rotary head assembly to the guide when the latter is in its operative position.

4. A tape guide system as set forth in claim 3, wherein is included a third tape pick-up element intermediate the retracted and operative positions of one of the first mentioned pick-up elements, said third pick-up element being mounted on said base plate in alignment with the location at which tape extends out of the cartridge when the latter is mounted on the base plate, whereby the tape can extend straight out of the cartridge.

5. In a video reproducer and/or recorder apparatus of the type including a rotary transducer mount of curvilinear configuration, which apparatus is adapted to utilize a cartridge which presents a span of tape at an angle unsuited for helical scanning, a tape pick-up system comprising:

a base plate, a pair of tape pick-up elements, one of said tape pick-up elements having a conical surface and extending with its apex upwardly in relation to said base plate, the other pick-up element having a conical surface and extending with its apex pointing toward said base plate, and means coupled with the tape pick-up elements for moving them from retracted positions within the tape cartridge and behind the span into operative positions adjacent to said transducer mount, whereby the tape pick-up elements withdraw a stretch of tape out of the cartridge and wrap said stretch about a portion of said mount, said conical surfaces changing the course angle of the tape wrap for the purpose of helical scanning.

* * * * *